2 Sheets—Sheet 1.

E. H. AUSTIN.
Vitreous Lining for Pipe Connections.

No. 209,103. Patented Oct. 22, 1878.

WITNESSES

INVENTOR
Elijah H. Austin
By Wm Frank Browne
his Attorney

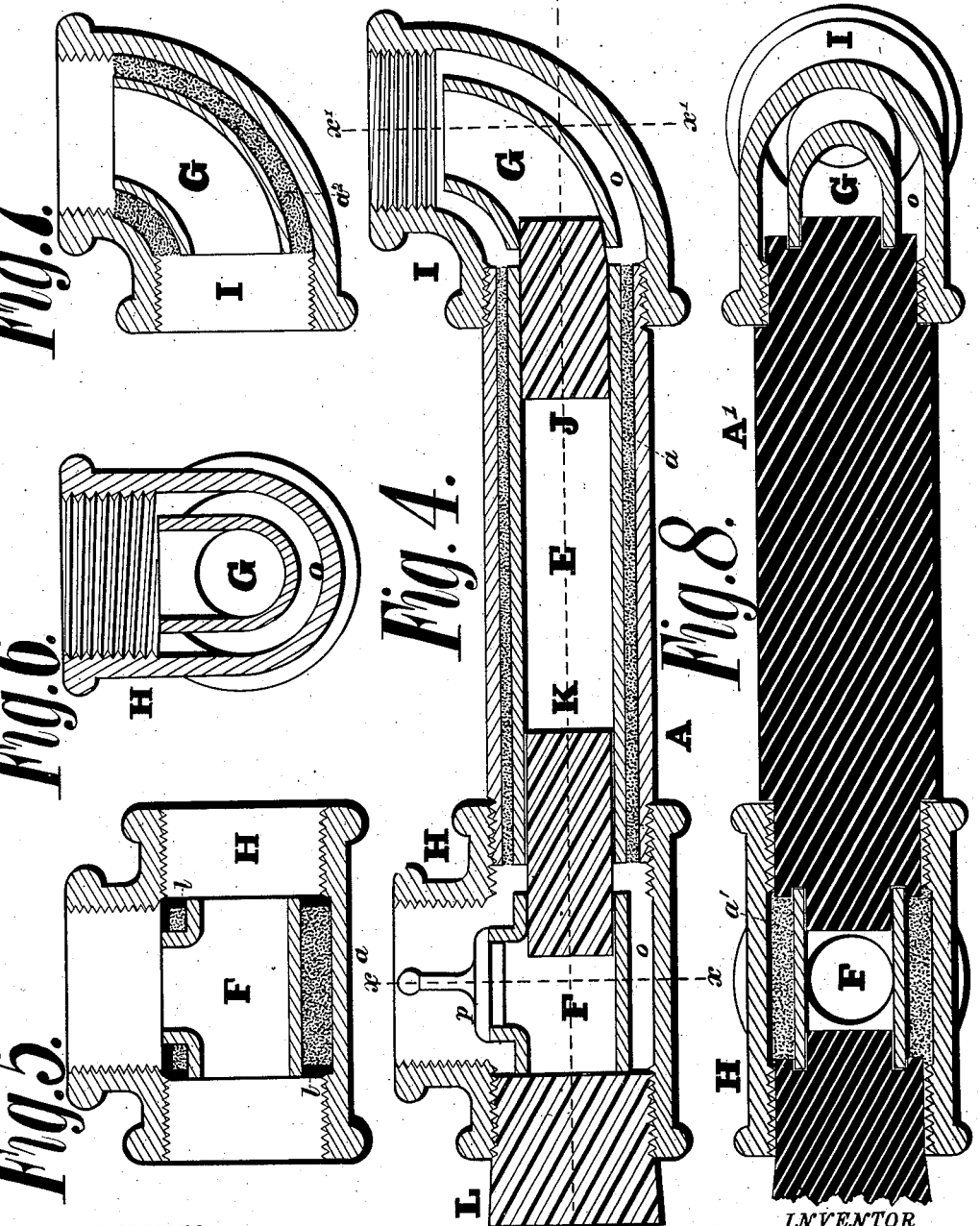

UNITED STATES PATENT OFFICE.

ELIJAH H. AUSTIN, OF NEW YORK, N. Y.

IMPROVEMENT IN VITREOUS LININGS FOR PIPE-CONNECTIONS.

Specification forming part of Letters Patent No. 209,103, dated October 22, 1878; application filed June 12, 1878.

*To all whom it may concern:*

Be it known that I, ELIJAH H. AUSTIN, of the city, county, and State of New York, have invented new and useful Improvements in Lining for Elbows and T-Joints, and a process for filling the space between said lining and elbow and T-connections with a fluid elastic or plastic substance; and I hereby declare that the following is a clear, full, and exact description thereof, reference being had to the accompanying drawings, which form a part of the following specification.

The object of my invention is to produce a glass or other vitreous lining for lining pipe-connections which are to be used in connection with pipe lined with glass or other vitreous material, said pipe being for the purpose of conducting water and other fluids, and also for underground telegraphic and other electrical purposes.

Figure 1:
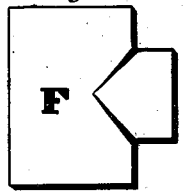
Figure 2:
Figure 3:
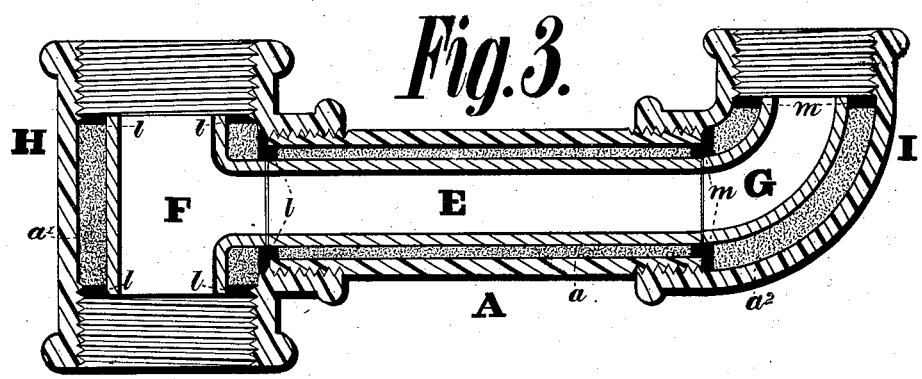

Figure 1 represents a glass T-lining for lining an iron T, said T to be used in connection with glass-lined iron pipe. Fig. 2 is a glass elbow for lining elbow-connections, and is to be used in connection with glass-lined pipe. Fig. 3 is a sectional view, showing the glass-lined T and elbow in connection with a glass-lined pipe. Fig. 4 is a sectional view, showing the method adopted for filling the space between the glass lining T and elbow. Fig. 5 represents the T-space as filled and ready to be attached to a glass-lined pipe. Fig. 6 is a cross-section of the T shown in Fig. 4, cutting through at right angles with the run of the T, as indicated by the vertical dotted line. Fig. 7 is a sectional view of a glass-lined elbow ready for attaching to a glass-lined pipe. Fig. 8 is a longitudinal sectional view of Fig. 4, cutting through on the dotted line and at right angles with the plane of said figure.

Similar letters refer to corresponding parts in all of the figures.

The glass T-lining in the several figures is represented by the letter F, and G represents the glass L-linings.

In Fig. 3, A represents an iron glass-lined pipe, with glass-lined T (H) and L (I) thereon. $a$, $a^1$, and $a^2$ indicate the filling between the glass lining and iron pipe and its connections. $l$ and $m$ indicate hydraulic packing between the joints formed by the glass pipe-lining E and its glass-lining connections F and G.

The sectional view, Fig. 4, represents the method of filling the space between the glass lining and the iron connections, A being a glass-lined pipe with connections thereon. J and K are two plugs inserted in the ends of glass-lined pipe A, and project far enough to receive and support the glass T and L centrally within the connection H and I. As the rim of the T is in a horizontal position, a plug or stopper, L, should be screwed or inserted into the end thereof until it presses against the open end of the glass lining.

$p$ is a cap placed over the outlet end of the glass T-lining, so as to prevent the said glass T from becoming filled with the filling-material while pouring it in at the open end of the iron T (H.)

A cap should be placed over the open end of the glass L-lining for a similar purpose.

After the filling material has set, the T and L can be removed and the plug taken out, and then the surplus filling material removed until the ends of the glass lining project about one-eighth of an inch from the filling, thus leaving a space to be filled with hydraulic cement, as shown by the black joint $l$ and $m$ in Fig. 3.

When the glass-lined pipe is used for telegraphic or other electrical purposes an insulating material should be used in place of the cement.

Fig. 8 is a modification of Fig. 4, the modification being a grooved recess within the end of the plug for the reception of the glass lining. Said groove should be at a depth equal to the amount of filling to be removed to form the hydraulic-cement joint.

I do not limit myself to any particular substance for filling the space between the lining and pipe-fittings, for I am aware that various substances can be employed, and might be required, when the pipe and fittings are used for certain purposes; but when the pipe is used for conducting water to be used in dwellings and for chemical purposes, I prefer the use of calcined gypsum, or sulphate of lime, it being a good non-conductor. The water within the lining is kept at a more even temperature than it would be were other substances used; and the cost of the material, as well as the ease with which it is manipulated, commend it to general use.

I use hydraulic cement to form an impervious water-tight joint between the glass fittings and glass linings; but when the pipe is used to conduct an acid or fluid which will decompose said cement, a substance must be used to resist the action of said acid or fluid; and also when the lined pipe and its connections are used for telegraphic purposes the joints must be made tight with an insulated packing.

Neither do I limit myself to the use of glass and iron in the fittings; but any other suitable materials may be used in combination with the filling, as circumstances may suggest or the purposes require for which the fittings and connecting-pipe may be intended.

I make no claim in this patent to glass-lined pipes and fittings, as such subject-matter, broadly considered, is contained in my Patent No. 136,952, dated March 18, 1873; but

What I claim, and desire to secure by Letters Patent, is—

The combination, with a glass or vitreous lined pipe, of glass or vitreous lined pipe-fittings, and cement or equivalent packing interposed between the lining of the pipe and lining of the fittings, to constitute a water-tight joint, substantially as set forth.

ELIJAH H. AUSTIN.

Witnesses:
 LOUIS E. G. RADDE,
 F. W. BLECKWENN.